US012651183B2

(12) United States Patent
Liu et al.

(10) Patent No.: US 12,651,183 B2
(45) Date of Patent: Jun. 9, 2026

(54) METHOD FOR PREDICTING FACTUAL AND COUNTERFACTUAL OUTCOMES FROM OBSERVED DATA

(71) Applicant: NEC CORPORATION, Tokyo (JP)

(72) Inventors: Chunchen Liu, Beijing (CN); Wei Li, Beijing (CN)

(73) Assignee: NEC CORPORATION, Tokyo (JP)

( * ) Notice: Subject to any disclaimer, the term of this patent is extended or adjusted under 35 U.S.C. 154(b) by 1214 days.

(21) Appl. No.: 17/605,652

(22) PCT Filed: Apr. 23, 2019

(86) PCT No.: PCT/CN2019/083905
§ 371 (c)(1),
(2) Date: Oct. 22, 2021

(87) PCT Pub. No.: WO2020/215209
PCT Pub. Date: Oct. 29, 2020

(65) Prior Publication Data
US 2022/0222554 A1     Jul. 14, 2022

(51) Int. Cl.
*G06N 7/01* (2023.01)
(52) U.S. Cl.
CPC ..................................... *G06N 7/01* (2023.01)
(58) Field of Classification Search
CPC .......... G06N 7/01; G06N 3/045; G06N 3/047; G06N 3/08; G16H 50/20; G16H 20/10; G06F 17/00
See application file for complete search history.

(56) References Cited

U.S. PATENT DOCUMENTS

2011/0137847 A1     6/2011    Fahner
2011/0289036 A1    11/2011    Stojadinovic et al.
2016/0300036 A1    10/2016    Ramazzotti et al.

FOREIGN PATENT DOCUMENTS

CN        108734499 A    11/2018
CN        105701839 B     4/2019
(Continued)

OTHER PUBLICATIONS

Shimoni, Yishai, et al. "An evaluation toolkit to guide model selection and cohort definition in causal inference." arXiv preprint arXiv: 1906.00442 (2019). https://arxiv.org/pdf/1906.00442 (Year: 2019).*

(Continued)

*Primary Examiner* — Michael H Hoang
(74) *Attorney, Agent, or Firm* — Sughrue Mion, PLLC

(57) ABSTRACT

Embodiments of present disclosure provide a method, an electronic device and computer product program for predicting an operation outcome. A method of predicting an operation outcome includes determining first prediction model based on a first set of observed data. The method further includes determining a first probability model based on first set of observed objects subjected to first operation and a second set of observed objects subjected to a second operation different from first operation. The method further includes determining a second prediction model based on first set of observed data and first probability model. The method further includes determining first combination of at least the first, second prediction models, and first probability model for predicting a first final outcome of performing first operation on target object. Embodiments of present disclosure improve accuracy of individual treatment effect estimation and can be expanded to application scenarios with multiple treatment levels.

13 Claims, 5 Drawing Sheets

(56) References Cited

FOREIGN PATENT DOCUMENTS

| | | | |
|----|--------------|----|---------|
| JP | 2007-41705   | A  | 2/2007  |
| JP | 2015-82259   | A  | 4/2015  |
| JP | 2015-132863  | A  | 7/2015  |
| JP | 2017-524183  | A  | 8/2017  |
| JP | 2019-059348  | A  | 4/2019  |
| WO | 2011/095999  | A1 | 8/2011  |
| WO | 2018/225227  | A1 | 12/2018 |

OTHER PUBLICATIONS

Kim, Carolyn, and Osbert Bastani. "Learning interpretable models with causal guarantees." arXiv preprint arXiv:1901.08576 (2019). https://arxiv.org/abs/1901.08576 (Year: 2019).*

Alaa, Ahmed M., and Mihaela Van Der Schaar. "Bayesian nonparametric causal inference: Information rates and learning algorithms." IEEE Journal of Selected Topics in Signal Processing 12.5 (2018): 1031-1046. https://ieeexplore.ieee.org/stamp/stamp.jsp?tp=&arnumber=8387845 (Year: 2018).*

Johansson, Fredrik, Uri Shalit, and David Sontag. "Learning representations for counterfactual inference." International conference on machine learning. PMLR, 2016. https://proceedings.mlr.press/v48/johansson16.pdf (Year: 2016).*

Lee, Changhee, Nicholas Mastronarde, and Mihaela van der Schaar. "Estimation of individual treatment effect in latent confounder models via adversarial learning." arXiv preprint arXiv:1811.08943 (2018). https://arxiv.org/pdf/1811.08943 (Year: 2018).*

Office Action issued May 2, 2023 in Japanese Application No. 2021-562849.

Manabu Kuroki et al., "Bounds on the Causal Effects in Studies with a Latent Response Variable", The 21st Annual Conference of the Japanese Society for Artificial Intelligence, 2007, pp. 1-4 (4 pages total).

Japanese Office Action issued Aug. 22, 2023 in Application No. 2021-562849.

International Search Report of PCT/CN2019/083905 dated Jan. 15, 2020 [PCT/ISA/210].

* cited by examiner

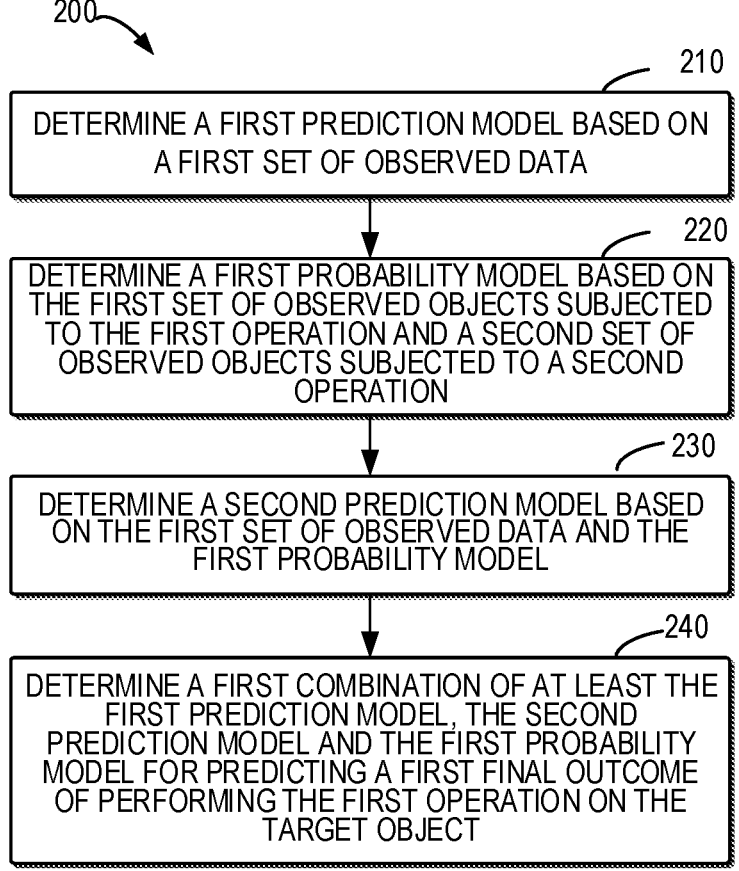

200

210

DETERMINE A FIRST PREDICTION MODEL BASED ON A FIRST SET OF OBSERVED DATA

220

DETERMINE A FIRST PROBABILITY MODEL BASED ON THE FIRST SET OF OBSERVED OBJECTS SUBJECTED TO THE FIRST OPERATION AND A SECOND SET OF OBSERVED OBJECTS SUBJECTED TO A SECOND OPERATION

230

DETERMINE A SECOND PREDICTION MODEL BASED ON THE FIRST SET OF OBSERVED DATA AND THE FIRST PROBABILITY MODEL

240

DETERMINE A FIRST COMBINATION OF AT LEAST THE FIRST PREDICTION MODEL, THE SECOND PREDICTION MODEL AND THE FIRST PROBABILITY MODEL FOR PREDICTING A FIRST FINAL OUTCOME OF PERFORMING THE FIRST OPERATION ON THE TARGET OBJECT

FIG. 2

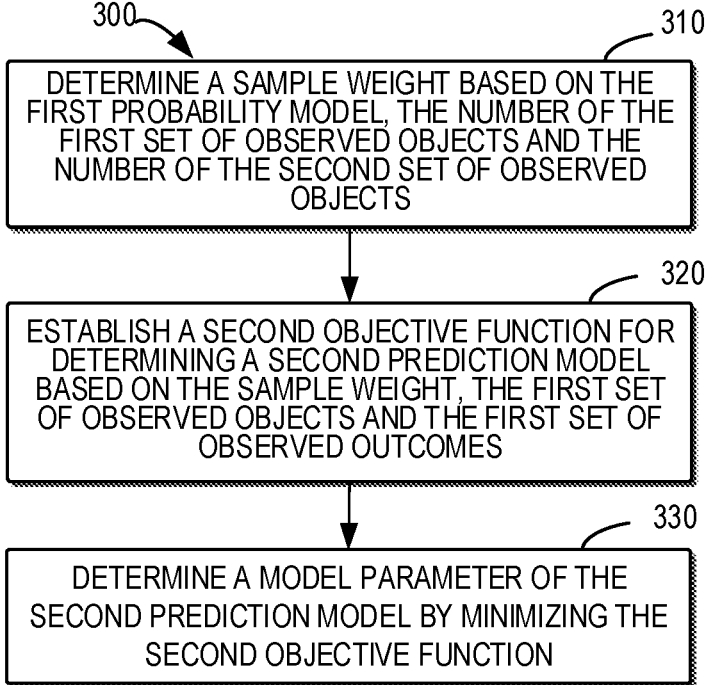

300

310

DETERMINE A SAMPLE WEIGHT BASED ON THE FIRST PROBABILITY MODEL, THE NUMBER OF THE FIRST SET OF OBSERVED OBJECTS AND THE NUMBER OF THE SECOND SET OF OBSERVED OBJECTS

320

ESTABLISH A SECOND OBJECTIVE FUNCTION FOR DETERMINING A SECOND PREDICTION MODEL BASED ON THE SAMPLE WEIGHT, THE FIRST SET OF OBSERVED OBJECTS AND THE FIRST SET OF OBSERVED OUTCOMES

330

DETERMINE A MODEL PARAMETER OF THE SECOND PREDICTION MODEL BY MINIMIZING THE SECOND OBJECTIVE FUNCTION

FIG. 3

METHOD FOR PREDICTING FACTUAL AND COUNTERFACTUAL OUTCOMES FROM OBSERVED DATA

CROSS REFERENCE TO RELATED APPLICATIONS

This application is a National Stage of International Application No. PCT/CN2019/083905, filed Apr. 23, 2019.

FIELD

Embodiments of the present disclosure mainly relate to the field of machine learning, and more specifically, to a method, electronic device, and computer program product for predicting an operation outcome.

BACKGROUND

With the rapid development of information technology, the scale of data has grown rapidly. Under such background and trends, machine learning has attracted increasingly extensive attention. Inferring causal relations is a fundamental problem in a variety of fields such as healthcare, education, employment, and ecology. Such causal inference problems are often termed as counterfactual questions in literature, such as "would this patient survive longer had he taken the new drug?" or "would this student get higher marks had he attended the educational training program?"

The main challenge of making predictions about treatment effect for each individual is that, for a specific treatment assignment, only the factual outcome can be observed, but the corresponding counterfactual outcome can never be observed. Without a counterfactual outcome, it is hard to determine the true treatment effect. Therefore, there is a need for a method for more accurately predicting treatment effect from observed data.

SUMMARY

Embodiments of the present disclosure provide a solution for predicting an operation outcome.

In a first aspect of the present disclosure, a method of predicting an operation outcome is provided. The method includes determining a first prediction model based on a first set of observed data, the first set of observed data including a first set of observed outcomes of performing a first operation on the first set of observed objects, the first prediction model used to predict a first potential outcome of performing the first operation on a target object. The method further includes: determining a first probability model based on the first set of observed objects subjected to the first operation and a second set of observed objects subjected to a second operation different from the first operation, the first probability model used to determine respective probabilities of performing the first operation and the second operation on the target object. The method further includes determining a second prediction model based on the first set of observed data and the first probability model, the second prediction model predicting a second potential outcome of performing the first operation on the target object by estimating an outcome of performing the first operation on the second set of observed objects. The method further includes determining a first combination of at least the first prediction model, the second prediction model and the first probability model for predicting a first final outcome of performing the first operation on the target object.

In a second aspect of the present disclosure, a method of predicting an operation outcome is provided. The method includes: predicting a first potential outcome of performing a first operation in a set of operations on a target object in response to determining that an operation in the set of operations is to be performed on the target object. The method further includes: determining a first probability of performing the first operation in the set of operations on the target object and a second probability of performing a second operation in the set of operations on the target object, the second operation being different from the first operation. The method further includes: predicting a second potential outcome of performing the first operation on the target object by estimating an outcome of performing the first operation on an observed object subjected to the second operation. The method further includes: predicting a first final outcome of performing the first operation on the target object at least based on the first potential outcome, the second potential outcome, the first probability and the second probability.

In a third aspect of the present disclosure, an electronic device is provided. The electronic device includes: a processor and a memory coupled to the processor, the memory including instructions stored thereon which, when executed by the processor, cause the device to perform operations. The operations include: determining a first prediction model based on a first set of observed data, the first set of observed data including a first set of observed outcomes of performing a first operation on a first set of observed objects, the first prediction model used to predict a first potential outcome of performing the first operation on a target object; determining a first probability model based on the first set of observed objects subjected to the first operation and a second set of observed objects subjected to a second operation different from the first operation, the first probability model used to determine respective probabilities of performing the first operation and the second operation on the target object; determining a second prediction model based on the first set of observed data and the first probability model, the second prediction model predicting a second potential outcome of performing the first operation on the target object by estimating an outcome of performing the first operation on the second set of observed objects; and determining a first combination of at least the first prediction model, the second prediction model and the first probability model for predicting a first final outcome of performing the first operation on the target object.

In a fourth aspect of the present disclosure, an electronic device is provided. The electronic device includes: a processor and a memory coupled to the processor, the memory including instructions stored thereon which, when executed by the processor, cause the device to perform operations. The operations comprise: predicting a first potential outcome of performing a first operation in a set of operations on a target object in response to determining that an operation in the set of operations is to be performed on the target object; determining a first probability of performing the first operation in the set of operations on the target object and a second probability of performing a second operation in the set of operations on the target object, the second operation being different from the first operation; predicting a second potential outcome of performing the first operation on the target object by estimating an outcome of performing the first operation on an observed object subjected to the second operation; and predicting a first final outcome of performing the first operation on the target object at least based on the first potential outcome, the second potential outcome, the first probability and the second probability.

In a fifth aspect of the present disclosure, a computer program product is provided, the computer program product tangibly stored on a computer-readable medium and including machine-executable instructions which, when executed, cause the machine to perform a method according to the first aspect.

In a sixth aspect of the present disclosure, a computer program product is provided, the computer program product tangibly stored on a computer-readable medium and including machine-executable instructions which, when executed, cause the machine to perform a method according to the second aspect.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following more detailed description of example embodiments of the present disclosure with reference to the accompanying drawings, the above and other objects, features, and advantages of the present disclosure will become more apparent, wherein same or corresponding elements are indicated by same reference numerals. In the drawings:

FIG. 2 shows a flowchart of a process of obtaining a model according to embodiments of the present disclosure;

FIG. 3 shows a flowchart of a process of determining a second prediction model according to embodiments of the present disclosure;

DETAILED DESCRIPTION OF IMPLEMENTATIONS

Figure 1:
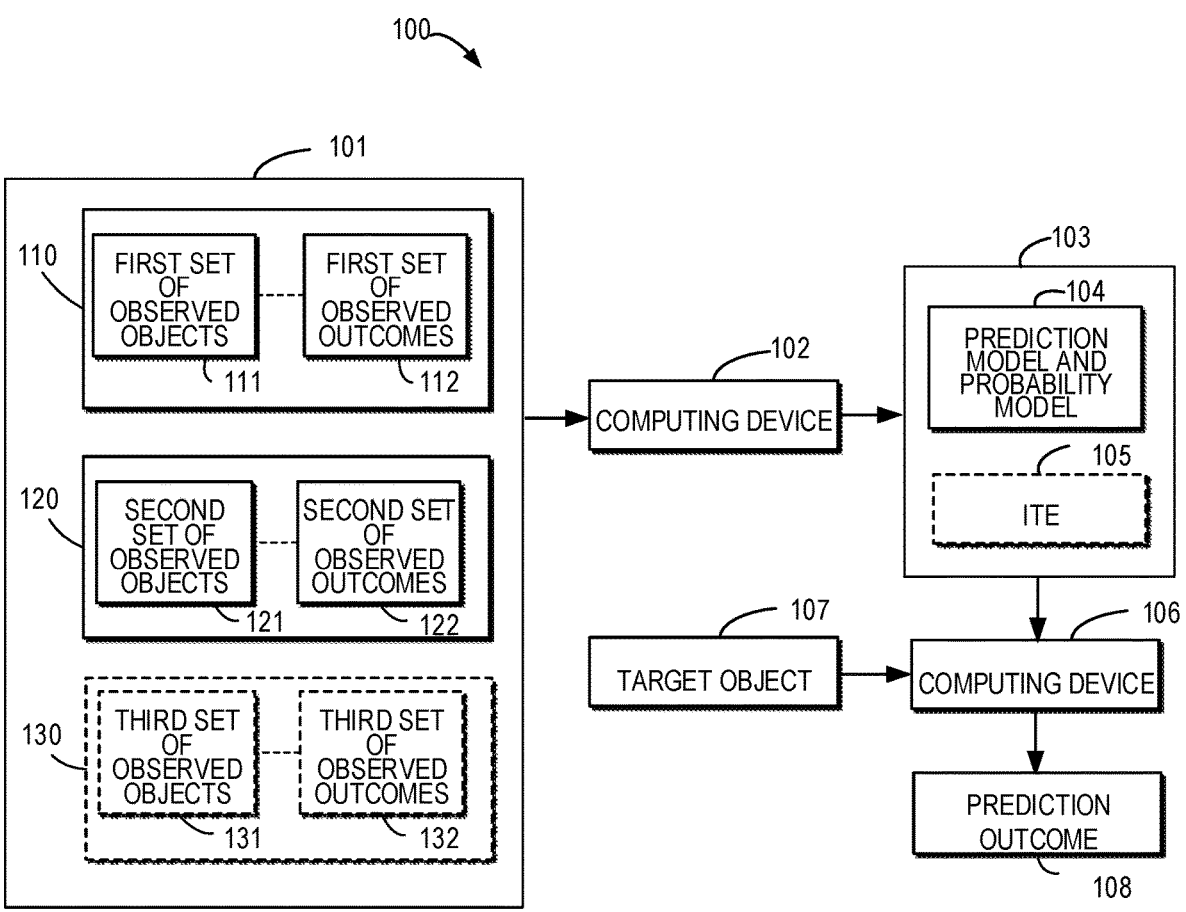
FIG. 1 shows a schematic view of an example environment in which multiple embodiments of the present disclosure can be implemented.

Principles of the present disclosure will now be described with reference to several example implementations. Although preferred embodiments of the present disclosure are illustrated in the accompanying drawings, it is to be understood that, these embodiments are discussed only for the purpose of enabling persons skilled in the art to better understand and thus implement the present disclosure, rather than limiting the scope of the present disclosure in any manner.

As used herein, the term "includes" and its variants are to be read as open-ended terms that mean "includes, but is not limited to." Unless otherwise stated, the term "or" is to be read as "and/or." The term "based on" is to be read as "based at least in part on." The terms "one example embodiment" and "an embodiment" are to be read as "at least one example embodiment." The term "another embodiment" is to be read as "at least one another embodiment." The terms "first," "second," and the like may refer to different or same objects. Other definitions, explicit and implicit, may be included below.

In embodiments of the present disclosure, the term "treatment assignment mechanism" is an underlying policy that depends on the individuals' features and determines which level of treatment (e.g., drug or placebo group) is assigned for each individual studied in an experiment. Herein, T is used to denote the treatment with a value of t, for example, t=0, 1 in the case of only two treatment levels.

In embodiments of the present disclosure, the term "potential outcome" refers to the outcome of an individual if the individual were assigned to a specified treatment level t, which is denoted by $Y_t$. For example, in the case of two treatment levels t=0, 1, each individual has two potential outcomes, $Y_0$ and $Y_1$; in the case of three treatment levels t=0, 1, 2, each individual has three potential outcomes, $Y_0$, $Y_1$, and $Y_2$.

In embodiments of the present disclosure, the term "counterfactual" refers to negating and re-characterizing facts that have occurred in the past, in order to construct a possible hypothetical outcome. For example, for individuals in treated group (T=1), the potential outcome $Y_1$ is the observed factual outcome, and $Y_0$ is the unobserved counterfactual outcome; whereas for individuals in control group (T=0), $Y_0$ is the observed factual outcome, and $Y_1$ is the unobserved counterfactual outcome.

In embodiments of the present disclosure, the term "individual treatment effect (ITE)" aims to measure how an individual (e.g., patient) responds to a specific treatment assignment (e.g., medication) based on the individual's features (e.g., height, weight, age, etc., and denoted as X). Herein, in the case of multiple treatment levels, ITE is defined $ITE(t_1, t_0; x)=E(Y_{t_1}|X=x)-E(Y_{t_0}|X=x)$. In a situation of two treatment levels, ITE is defined as $ITE(x)=E(Y_1-Y_0|X=x)$.

In embodiments of the present disclosure, the term "covariate shift" refers to the change in the distribution of the input features (covariates) present in two observed groups (e.g., the treated and control groups). This problem frequently occurs in observed studies and leads to the so-called "treatment selection bias" problem.

As mentioned above, in many actual scenarios, it is desirable to predict an outcome of an individual having received a certain treatment and to predict a difference between outcomes of the individual having different treatments, i.e., individual treatment effect (ITE), so as to enable a computing device to automatically make decisions or assist people in making decisions, i.e., determining whether a certain treatment or which one of multiple treatments is to be performed to an individual. For example, it might be desirable to predict possible impact of a certain drug or treatment on a patient's disease, so as to automatically make a treatment plan or assist a doctor in making a treatment plan. It might further be desirable to predict to which degree a training course may improve a student's scores, or predict the impact of advertising on consumers' final purchase behavior, etc. To make such predictions, it is necessary to know counterfactual information.

One possible way to estimate counterfactual information is by conducting randomized controlled trials. However, such trials are expensive and time-consuming, and are frequently not available. It is therefore necessary to make predictions on the basis of observed studies where the distribution of the data under treated and control groups are unknown and in general is different. This leads to the so-called "treatment selection bias" problem of estimating ITE from observed data.

Traditional methods of estimating ITE mainly focus on training regression models or performing sample re-weighting to estimate counterfactual outcomes, involving nearest neighbor matching, propensity score matching, propensity score re-weighting, and some tree and forest based methods, such as Bayesian Additive Regression Tree (BART) and causal forests. Other recent works in ITE estimation include representation learning approaches and Gaussian processes.

In the representation learning approach, a deep neural network for representation learning needs to be constructed first to map the feature space to the representation space and transfer the distributions of treated and control groups into the new representation space. Then, the error losses are obtained using another two representation-based deep neural networks to predict the factual outcomes across treated and control samples, and the error losses are used as the factual outcome loss. The measurement of distance between the treated and control distributions induced by the representation is obtained as the integral probability metric (IPM) distance. Finally, a weighted sum of the factual outcome error loss and the IPM distance is minimized.

The above-mentioned method of estimating ITE have several problems. The traditional outcome regression methods in general do not consider the "treatment selection bias" problem, whereas the re-weighting methods might be affected by the high variance of the finite samples. Representation learning approaches are biased even in the limit of infinite data and can only apply to settings with only two treatment levels, which has limited their use in practical practices with possibly many treatment levels. Gaussian processes are known to have poor complexity, O (N3), with the number of samples, so it is not easy to apply this approach to large-scale observational studies.

According to the embodiments of the present disclosure, a solution is proposed for predicting an operation outcome. In the solution, based on observed data, firstly, a factual outcome model and a propensity score model are built, then a counterfactual outcome model is determined based on the factual outcome model and the propensity score model, and finally a treatment outcome and ITE are predicted through the weighted average of the factual and counterfactual outcome models. The solution of the present disclosure not only can correct the covariate shift in observed data and improve the accuracy of estimation of ITE and treatment outcome, but also can be extended to application scenarios with multiple treatment levels and can be easily applied to large-scale observational studies.

The embodiments of the present disclosure will be described in detail with reference to the drawings.

FIG. 1 shows a schematic view of an example environment 100 in which multiple embodiments of the present disclosure can be implemented. In the example environment 100, a computing device 102 generates a model 103 based on an observed dataset 101. The model 103 is used to predict a final outcome and individual treatment effect ITE of performing one or more operations on a target object 107. The model 103 may include a prediction model and a probability model 104 to be described in detail below, and may define how to combine outputs of these models to predict an operation outcome. The model 103 may further include an ITE representation 105, which predicts a difference between final outcomes of performing an operation and another operation on the target object 107 by combining the outputs of the prediction model and the probability model 104. The difference can be considered as ITE for the target object 107.

A first set of observed data 110 includes a first set of observed outcomes 112 of performing first operations on a first set of observed objects 111, and a second set of observed data 120 includes a second set of observed outcomes 122 of performing second operations on a second set of observed objects 121. In some embodiments, the observed dataset 101 may further include a third set of observed data 130, which include a third set of observed outcomes 132 of performing third operations on a third set of observed objects 131. The first operation, the second operation, and the third operation herein are different from each other. The first set of observed objects 111, the second set of observed objects 121, and the third set of observed objects 131 are different from each other. The first operation, the second operation, and the optional third operation described herein may be regarded as different treatments given to object, and the terms of treatment and operation may be used interchangeably in the following description.

Although FIG. 1 only shows the first set of observed data 110, the second set of observed data 120, and the optional third set of observed data 130, it should be understood that, embodiments of the present disclosure may be applied to scenarios with more treatment levels, therefore the observed dataset 101 may further include more sets of observed data, wherein object in each set of observed data is subjected to a different operation.

The observed dataset 101 includes an operation or treatment (T), an observed outcome (Y), and feature information (X) for each studied object. In the case of two different treatments, T is binary. For the sake of discussion, T=1 is used to denote the first operation (e.g., the treated group), and T=0 is used to denote the second operation (e.g., the control group). If there is a third operation, T=3 is used to denote the third operation. The first set of observed outcomes 112 and the second set of observed outcomes 122 may be represented by Y, and Y may be discrete or continuous. The first set of observed objects 111 and the second set of observed objects 121 may be represented by their feature X, and the feature X may include multiple pretreatment variables that may be either discrete or continuous. The observed dataset 101 may come from multiple observed studies in a variety of disciplines.

A computing device 106 may obtain the model 103 generated by the computing device 102 and the feature X of the target object 107, and provide a prediction outcome 108 based on the model 103. The prediction outcome 108 may include a prediction about an outcome of performing a certain operation on the target object 107, and may further include a prediction about a difference between outcomes of performing two different operations on the target object 107, i.e., a prediction for ITE.

As one example, in medical studies, the operation or treatment T indicates whether a patient receives Aspirin or not, the outcome Y indicates whether the patient's headache is gone or not, and the feature X may include information of the patient, such as age, gender, blood pressure, etc. The first set of observed data 110 may include the features X of multiple patients who have received Aspirin and whether their headache disappears after receiving the drug; and the second set of observed data 120 may include the features X of multiple patients who have not received Aspirin and whether their headache disappears or not. Based on such observed data, the computing device 102 may generate the model 103, and by using the model 103, the computing device 106 may predict whether the headache of the target object 107 disappears in a situation where the target object 107 receives Aspirin and in a situation where then target object 107 does not receive Aspirin, and may further predict the treatment effect of Aspirin on the target object 107 to determine or assist in determining whether the target object 107 should be treated with Aspirin or not.

As another example, the operation or treatment T may represent whether a product can be recommended to a consumer or not, the outcome Y represent s whether the consumer may buy this product, and the feature X may include information of the consumer, such as incomes, purchase history, etc. In this scenario, the first set of observed data 110 may include the features of consumers to which the product is recommended, and whether they have bought the product; the second set of observed data 120 may include the features of consumers to which the product is not recommended, and whether they have bought the product. Similarly, the computing device 106 may use the generated model 103 to predict the effect of product push on the target object 107, so as to determine or assist in determining whether to push the product to the target object 107.

In order to have a clearer understanding of the solution provided by embodiments of the present disclosure, embodiments of the present disclosure will be further described with reference to FIG. 2. This figure shows a flowchart of a process 200 of obtaining a model according to embodiments of the present disclosure. The process 200 may be implemented by the computing device 102 in FIG. 1. For the sake of discussion, the process 200 will be described in conjunction with FIG. 1, and T=1 is used to represent the first operation, T=2 is used to represent the second operation, and T=t is used to represent any operation.

At block 210, the computing device 102 determines a first prediction model based on a first set of observed data 110. The first set of observed data 110 includes a first set of observed outcomes 112 of performing the first operation on a first set of observed objects 111, and the first prediction model is used to predict a first potential outcome of performing the first operation on a target object 107. The first prediction model herein may also be referred to as a factual outcome prediction model for the first operation.

The first prediction model may be determined by using any appropriate method, e.g., using a neural network. In some embodiments, based on the first set of observed objects 111 and the first set of observed outcomes 112, the computing device 102 may establish a first objective function for determining the first prediction model and determine a model parameter of the first prediction model by minimizing the first objective function.

For example, the computing device 102 may train a deep neural network to model respective observed outcomes Y against features X of respective observed objects in the first set of observed objects 111 (e.g., observed objects with T=1), thereby obtaining the conditional expectation of Y given T=1 and features X, i.e., E(Y|X, T=1). After the neural network model is fully trained, the built first prediction model, i.e., the factual outcome model for the first operation, may be as shown in equation (1):

$$E(Y|X,T=1) \tag{1}$$

In some embodiments, the computing device 102 may further determine a factual outcome prediction model for the second operation based on the second set of observed data 120, which is also referred to as the fourth prediction model herein. The fourth prediction model is used to predict a potential outcome of performing the second operation on the target object 107.

Similar to determination of the first prediction model, the computing device 102 may also use a neural network to determine the fourth prediction model. For example, the computing device 102 may train a deep neural network to model respective observed outcomes Y against features X of respective observed objects in the second set of observed objects 121 (e.g., observed objects with T=2), thereby obtaining the conditional expectation of Y given T=2 and features X, i.e., E(Y|X, T=2). After the neural network model is fully trained, the built fourth prediction model, i.e., the factual outcome model for the second operation, may be as shown in equation (2):

$$E(Y|X,T=2) \tag{2}$$

In practices, to reduce computational complexity when training deep neural networks, the number of hidden layers may be set to be 1 or 2, the dimensions of all hidden layers are the same and larger than the dimension of the feature X, a learning rate is a candidate set {1.0, 0.1, 0.01, 0.001, 0.0001}, a regularization parameter is a candidate set {0, 1e-4, 2e-2}, a batch size is 64, and iterations are 10000. Then, optimal parameters may be selected from the candidate sets by using the training/test split technique frequently adopted in machine learning algorithms.

It should be understood that the above-mentioned training approaches for neural networks are only illustrative and not intended to limit the scope of the present disclosure. It should be further understood that, for any T=t, similarly, a factual outcome prediction model for the t-th operation may be determined based on the observed data, as shown in equation (3):

$$E(Y|X,T=t) \tag{3}$$

A factual outcome prediction model for any operation t may be determined in other ways. For example, a representation of the features X may be learned, and the factual outcome prediction model for the operation t may be determined by learning a neural network in representation space of the features X.

At block 220, the computing device 102 determines a first probability model based on the first set of observed objects 111 subjected to the first operation and a second set of observed objects 121 subjected to a second operation different from the first operation. The first probability model is used to determine respective probabilities of performing the first operation and the second operation on the target object 107.

In embodiments where there is a third operation, the computing device 102 may determine a second probability model based on the first set of observed objects 111, the second set of observed objects 121, and a third set of observed objects 131 subjected to the third operation. The second probability model is used to determine a probability of performing the third operation on the target object 107.

As used herein, the first probability model, the second probability model, and possibly more probability models are collectively referred to as probability model. It should be understood that, the first probability model may include two models for determining a first probability of performing the first operation on the target object 107 and a second probability of performing the second operation on the target object 107, respectively, e.g., P(T=1|X) and P(T=2|X), as described below.

An implementation of the probability model is a propensity score model. The computing device 102 may use a deep neural network to model the treatment or operation T against the features X (respective observed objects in the observed dataset 101), thereby obtaining the probability model. For example, the computing device 102 may train a deep neural network to model the respective operations T against the features X of the observed object, thereby obtaining the conditional probability of the individual object subjected to the t-th operation given the features X as the probability model, i.e., as shown in equation (4):

$$P(T=t|X) \tag{4}$$

Equation (4) represents the probability of performing the t-th operation on the target object 107 with the features X. For example, P(T=1|X) denotes the probability of performing the first operation on the target object 107 with the features X; P(T=2|X) denotes the probability of performing the second operation on the target object 107 with the features X; P(T=3|X) denotes the probability of performing the third operation on the target object 107 with the features X. The probability model as shown in equation (4) may be regarded as a propensity score model or the above-mentioned treatment assignment mechanism. It should be understood that, all observed objects in the observed dataset 101 may be used to train a neural network used for the probability model.

When training the deep neural network in practical applications, since the value of T is discrete, cross-entropy loss may be used as the loss function, the number of hidden layers is 1 or 2, the dimensions of all the hidden layers are the same and larger than the dimension of X, a learning rate is a candidate set {0.8, 0.1, 0.05, 0.005, 0.001}, a regularization parameter is 0, a batch size is 64, and iterations are 10000. Similar to the training process of the deep neural networks in the factual outcome prediction model, the computing device 102 may also use training/test split technique to select optimal hyper-parameters from the candidate sets.

At block 230, the computing device 102 determines a second prediction model based on the first set of observed data 110 and the first probability model determined at block 220. The second prediction model predicts a potential outcome of performing the first operation on the target object 107 by estimating the outcome of performing the first operation on the second set of observed objects 121.

In embodiments where there is a third operation, the computing device 102 may further determine a third prediction model based on the first set of observed data 110, the first probability model, and the second probability model. The third prediction model predicts a third potential outcome of performing the first operation on the target object 107 by estimating an outcome of performing the first operation on the third set of observation objects 131. The second prediction model and the third prediction model described herein may be regarded as the counterfactual outcome prediction models for the first operation.

In this regard, FIG. 3 shows a flowchart of a process 300 for determining the second prediction model according to the embodiments of the present disclosure. Further, a general process for determining a counterfactual outcome model will be described in conjunction with FIG. 3. In some embodiments, the process 300 may be regarded as an implementation of block 230 in FIG. 2, and may be performed by the computing device 102 as shown in FIG. 1. It should be understood that, the process 300 may further comprise an additional step which is not shown and/or may omit a step which is shown. The scope of the present disclosure is not limited in this regard.

At block 310, the computing device 102 determines a sample weight based on the first probability model determined at block 220, the number of the first set of observed objects 111, and the number of the second set of observed objects 121. The sample weight is used to correct the shift of the distribution of the second set of observed objects 121 relative to the distribution of the first set of observed objects 111. The sample weight determined herein may be regarded as importance sampling weight, which is used to correct the above-mentioned covariate shift problem and will be used for subsequent counterfactual outcome prediction.

Overall, for the observed object subjected to the $\tilde{t}$-th operation, the weight $w_{\tilde{t},t}$ for the t-th operation is as shown in equation (5):

$$w_{\tilde{t},t} = \frac{p(X|T = \tilde{t})}{p(X|T = t)} \tag{5}$$

wherein p(X|T=t) represents the conditional density function of X given T=t.

Since the counterfactual outcome prediction model for the first operation is to be determined here, the sample weight for the observed object not subjected to the first operation is first considered. Take the circumstances shown in FIG. 1 as an example. For the second set of observed objects 121 subjected to the second operation, the sample weight for the first operation is represented by $w_{2,1}:=w_2$ which can be represented as equation (6):

$$w_2 = \frac{p(X|T = 2)}{p(X|T = 1)} \tag{6}$$

$W_2$ may be calculated according to equation (7):

$$w_2 = \frac{p(X|T = 2)}{p(X|T = 1)} = \frac{P(T = 1)}{P(T = 2)} \times \frac{P(T = 2|X)}{P(T = 1|X)} \tag{7}$$

wherein $$\frac{P(T = 1)}{P(T = 2)}$$

may be estimated by the number of the first set of observed objects 111 and the number of the second set of observed objects 121, and $$\frac{P(T = 2|X)}{P(T = 1|X)}$$

may be estimated by the probability model determined at block 220.

Next, the computing device 102 may determine the second prediction model, i.e., the counterfactual outcome prediction model for the first operation, based on the determined sample weight (e.g., equation (7)) and the first set of observed data 110. For example, the computing device 102 may use the transfer learning technique to determine the second prediction model.

At block 320, the computing device 102 establishes a second objective function for determining the second prediction model based on the sample weight, the first set of observed objects 111, and the first set of observed outcomes 112.

Counterfactual outcomes $Y_1$ of the second set of observed objects 121 subjected to the first operation are unobserved. Based on transfer learning approaches, the counterfactual outcomes for the second set of observed objects 121 may be predicted by means of the first set of observed objects 111 for which $Y_1$ are observed and the respective first set of observed outcomes 112. For example, an objective function may be established as shown in equation (8):

$$\Sigma_{i:T_i=1} w_{2i} L(Y_i, h_2(X_i)) + \alpha_2 \cdot \mathfrak{R}(h_2) \tag{8}$$

wherein $h_2(\cdot)$ denotes a deep neural network, $\alpha_2$ denotes the regularization parameter, and $\mathfrak{R}(\cdot)$ denotes model complexity penalty term. The objective function denotes calculating a sum of each observed object in the first set of observed objects 111 ($T_i=1$). It should be understood that, in a situation with more than two treatment levels, the objective function established here should further include a weight item $W_{ti}$ for another operation t.

At block 330, the computing device 102 determines a model parameter of the second prediction model by minimizing the second objective function, thereby obtaining the second prediction model. For example, the computing device 102 may learn a neural network $h_2(X)$ by minimizing the objective function as shown in equation (8), and obtain the second prediction model by using $h_2(X)$, as shown in equation (9):

$$E(Y_1|X, T=2) \tag{9}$$

In embodiments where there is the third operation, the computing device 102 may further consider a weight $w_{3,1}$: $=w_3$ of objects 131 subjected to the third operation for the first operation of the third set, as derived from equation (5). Thereby, the above-mentioned third prediction model may be obtained similarly, as shown in equation (9'):

$$E(Y_1|X, T=3) \tag{9'}$$

The process of determining the counterfactual outcome prediction model for the first operation, i.e., the second prediction model and possibly the third prediction model, has been described above. In some embodiments, the computing device 102 may similarly determine the counterfactual outcome prediction model for any t-th operation (e.g., second operation). For the sake of discussion, the counterfactual outcome prediction model for the second operation is referred to as the fifth prediction model herein. For example, the computing device 102 may determine the fifth prediction model based on the second set of observed data 120 and the first probability model determined at block 220. The fifth prediction model predicts a potential outcome of performing the second operation on the target object 107 by estimating an outcome of performing the second operation on the first set of observed objects 111.

The fifth prediction model may be determined in a similar manner to the process described with reference to FIG. 3. Since the counterfactual outcome prediction model for the second operation is to be determined here, the sample weight for the observed object which is not subjected to the second operation is first considered. Similar to those described with reference to block 310, for the first set of observed objects 111 subjected to the first operation, the sample weight for the second operation thereof is represented by $w_{1,2} := w_1$, which is denoted in equation (10):

$$w_1 = \frac{p(X|T=1)}{p(X|T=2)} \tag{10}$$

$W_1$ may be calculated according to equation (10):

$$w_1 = \frac{p(X|T=1)}{p(X|T=2)} = \frac{P(T=2)}{P(T=1)} \times \frac{P(T=1|X)}{P(T=2|X)} \tag{11}$$

wherein $$\frac{P(T=2)}{P(T=1)}$$

may be estimated by the number of the first set of observed objects 111 and the number of the second set of observed objects 121, and $$\frac{P(T=1|X)}{P(T=2|X)}$$

may be estimated by the probability model determined at block 220. In particular, if there are only two treatment levels, $w_1 = 1/w_2$.

Similar to those described with reference to block 320, the computing device 102 proceeds to establish an objective function for determining the fifth prediction model based on the sample weight, the second set of observed objects 121, and the second set of observed outcomes 122.

The counterfactual outcomes $Y_2$ of the first set of observed objects 111 subjected to the second operation are unobserved. Based on transfer learning approaches, the counterfactual outcomes for the first set of observed objects 111 may be predicted by means of the second set of observed objects 121 whose outcomes $Y_2$ are observed and the respective second set of observed outcomes 122. For example, an objective function may be established as shown in equation (12):

$$\Sigma_{i:T_i=2} w_{1i} L(Y_i, h_1(X_i)) + \alpha_1 \cdot \mathfrak{R}(h_1) \tag{12}$$

wherein $h_1(\cdot)$ denotes a deep neural network, $\alpha_1$ denotes the regularization parameter, and $\mathfrak{R}(\cdot)$ denotes the model complexity penalty term. The objective function indicates calculating a sum of each observed object i in the second set of observed objects 121 ($T_i=2$).

Similar to those described with reference to block 330, the computing device 102 then may learn may learn a neural network $h_1(X)$ by minimizing the objective function as shown in equation (12) and obtain the second prediction model by using $h_1(X)$, as shown in equation (13):

$$E(Y_2|X, T=1) \tag{13}$$

In embodiments where there is the third operation, similarly, a counterfactual outcome prediction models for the second operation of the third set of observed objects 131 subjected to the third operation may be determined, as shown in equation (13'):

$$E(Y_2|X, T=3) \tag{13'}$$

The determination the counterfactual outcome prediction model has been described by taking two and three treatment levels as examples, respectively. For multiple treatment levels, the computing device 102 may determine a counterfactual outcome prediction model for the t-th operation given any $\bar{t} \neq t \in T$, as shown in equation (14):

$$E(Y_t | T = \bar{t}, X) \tag{14}$$

In such embodiments, unstable problems in traditional methods may be avoided by replacing the weights $w_{1t}{}^\gamma$ and $w_{0t}{}^\gamma$ in traditional re-weighting methods with the above-described sample weights. In addition, another advantage of the method is that training/test split techniques can still be used to select optimal parameters by using the weighted error as test error, although the counterfactual outcomes are unobserved.

Still with reference to FIG. 2, at block 240, the computing device 102 determines a first combination of at least the first prediction model, the second prediction model and the first probability model for predicting a first final outcome of performing the first operation on the target object 107. For example, the computing device 102 may determine the first combination by using equations (1), (4), and (9). For example, the computing device 102 may combine outputs of respective prediction models and the probability model according to a predetermined relationship.

Overall, for any t-th operation, the final outcome of performing the t-th operation on the target object 107 with the features X may be predicted from the following equation:

$$E(Y_t | X) = E(Y | T = t, X) P(T = t | X) + \Sigma_{\bar{t} \neq t} P(T = \bar{t} | X) E(Y_t | T = \bar{t}, X) \tag{15}$$

wherein the item $E(Y | T = t, X)$ is the factual outcome prediction model described with respect to block 210, $P(T = t | X)$ and $P(T = \bar{t} | X)$ are the probability models, i.e., the propensity score models, described with respect to block 220, and $E(Y_t | T = \bar{t}, X)$ is the counterfactual outcome prediction model described with respect to block 230 and FIG. 3.

For the first combination used to predict the final outcome of performing the first operation on the target object 107, equation (15) may be embodied as:

$$E(Y_1 | X) = E(Y | T = 1, X) P(T = 1 | X) + \Sigma_{\bar{t} \neq 1} P(T = \bar{t} | X) E(Y_1 | T = \bar{t}, X) \tag{16}$$

If there are only two treatment levels (e.g., 1 and 2), the first combination may further be embodied as:

$$E(Y_1 | X) = E(Y | X, T = 1) P(T = 1 | X) + P(T = 2 | X) E(Y_1 | X, T = 2) \tag{17}$$

If there are three treatment levels (e.g., 1, 2, and 3), the first combination may further be embodied as:

$$E(Y_1 | X) = E(Y | X, T = 1) P(T = 1 | X) + P(T. = 2 | X) E(Y_1 | X, T = 2) + P(T = 3 | X) E(Y_1 | X, T = 3) \tag{17}$$

In this manner, the computing device 102 generates the first combination for predicting the final outcome of performing the first operation on the target object 107. The computing device 102 may provide the above-described factual outcome prediction model, counterfactual outcome prediction model, and probability model as a portion of the model 103 that the computing device 106 can use to determine the prediction outcome and ITE.

In some embodiments of the present disclosure, the computing device 102 may generate a combination for predicting a final outcome of performing any t-th operation on the target object 107. For example, the computing device 102 may determine a second combination based on the above-mentioned fourth prediction model, the fifth prediction model and the probability model for predicting a second final outcome of performing the second operation on the target object 107.

For the second combination used to predict the final outcome of performing the second operation on the target object 107, equation (15) may be embodied as:

$$E(Y_2 | X) = E(Y | T = 2, X) P(T = 2 | X) + \Sigma_{\bar{t} \neq 2} P(T = \bar{t} | X) E(Y_1 | T = \bar{t}, X) \tag{18}$$

If there are only two treatment levels, the computing device 102 may use, for example, equations (2), (4), and (13) to determine the second combination. Similar to equation (17), in this situation, the second combination may be embodied as:

$$E(Y_2 | X) = E(Y | X, T = 2) P(T = 2 | X) + P(T = 1 | X) E(Y_2 | X, T = 1) \tag{19}$$

The computing device 102 may provide the above-determined combination for predicting the final outcome of performing the t-th operation on the target object 107, i.e., $E(Y_t | X)$, so that the outcome of the target object 107 subjected to a certain operation or treatment can be predicted. In some situations, it is further desirable to predict a difference in performing different treatments or operations on the target object 107, i.e., it is desirable to predict ITE.

In some embodiments, the computing device 102 may determine a difference representation based on the above-mentioned first combination and second combination for predicting the difference between the first final outcome of performing the first operation on the target object 107 and the second final outcome of performing the second operation on the target object 107. The difference representation is, for example, the ITE representation 105 shown in FIG. 1.

Overall, the individual treatment effect ITE for any two operations $t_1$ and $t_2$ may be indicated as the following equation:

$$ITE(t_1, t_2) = E(Y_{t_1} | X) - E(Y_{t_2} | X) \tag{20}$$

wherein $E(Y_{t_1} | X)$ and $E(Y_{t_2} | X)$ may be obtained from equation (15). As seen from equation (20), the value of ITE not only depends on the feature information (value of X) of the individual (target object 107) but also depends on the considered treatment level. The definition allows predicting ITE between any two treatment levels.

The computing device 102 may provide the model 103, including but not limited to, the prediction model and the probability model 104, and the model of ITE representation 105, to the computing device 106. Based on the model 103, the computing device 106 may predict at least one of the operation or treatment outcome and individual treatment effect for the target object 107. For example, the computing device 106 may predict the difference in a patient receiving and not receiving a certain treatment, thereby automatically making a decision or assist a doctor or patient in making a decision.

The model for obtaining the prediction operation outcome and ITE according to the present disclosure has been described. The model can not only improve the accuracy of estimating an operation outcome and ITE, but also can be expanded to scenarios with multiple treatment levels. In addition, the solution can further be easily applied to large-scale observational studies.

Figure 4:
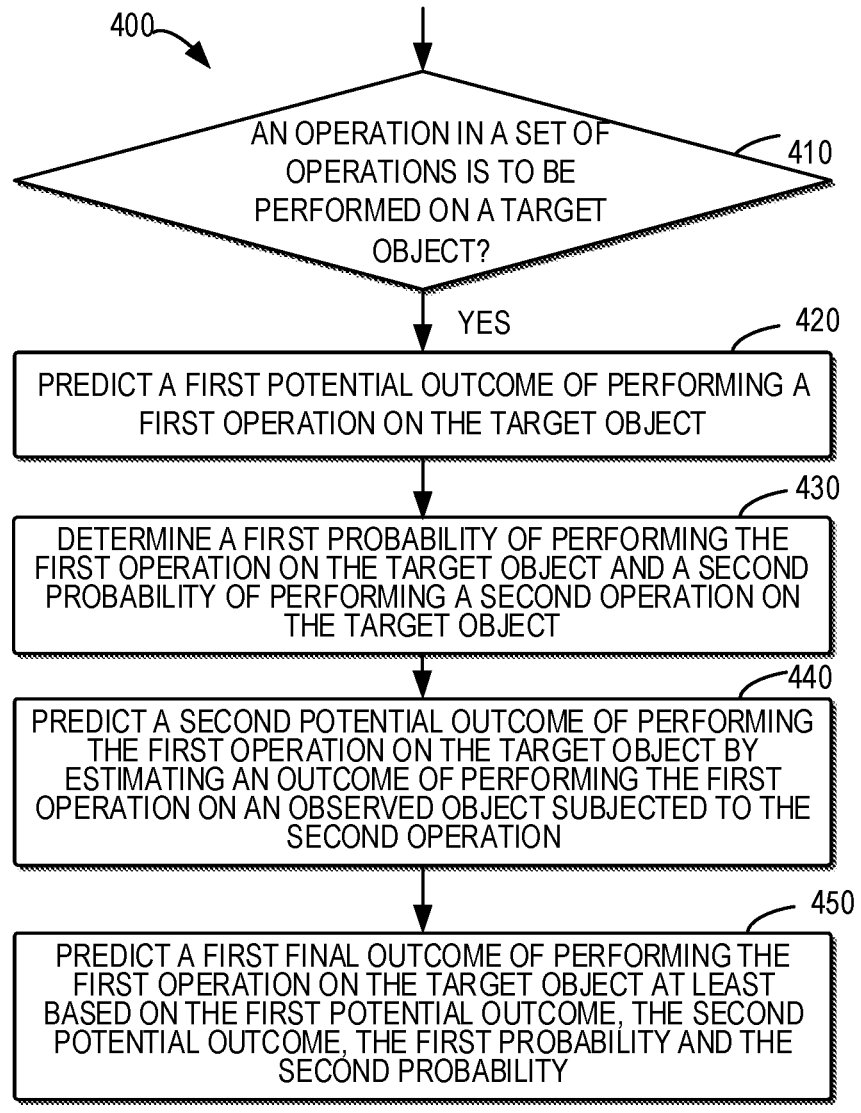
FIG. 4 shows a flowchart of a process of predicting an operation outcome according to embodiments of the present disclosure.

FIG. 4 shows a flowchart of a process 400 of predicting an operation outcome according to embodiments of the present disclosure. The process 400 may be implemented by the computing device 106 as shown in FIG. 1. For the sake of discussion, the process 400 will be described in conjunction with FIG. 1.

At block 410, the computing device 106 determines whether to perform an operation in a set of operations on the target object 107. For example, when receiving an input (value x of X) about a feature X of the target object 107, the computing device 106 may considered that a certain operation is to be performed on the target object 107. It should be understood that the first operation and the second operation described herein may refer to any two operations of multiple treatment levels, instead of being limited to the situation of only two treatment levels.

If it is determined at block 410 that an operation in the set of operations is to be performed on the target object 107, the process proceeds to block 420. At block 420, the computing device 106 predicts a first potential outcome of performing a first operation ($t_1$) on the target object 107. The computing device 106 may obtain the first prediction model described with respect to block 210, and predict the first potential outcome based on the first prediction model. For example, the first potential outcome $E(Y|X=x, T=t_1)$ may be obtained by using equation (3).

At block 430, the computing device 106 determines a first probability of performing the first operation on the target object 107 and a second probability of performing a second operation ($t_2$) on the target object 107. The computing device 106 may obtain the probability model described with respect to block 220, and determine respective probabilities based on the probability model. For example, the computing device 106 may use equation (4) to determine that the probabilities of performing the first operation ($t_1$) and the second operation ($t_2$) on the target object 107 are $P(T=t_1|X=x)$ and $P(T=t_2|X=x)$ respectively. In an embodiment where there is a third operation ($t_3$), the computing device 106 may further use equation (4) to determine that the probability of performing the third operation ($t_3$) on the target object 107 is $P(T=t_3|X=x)$.

At block 440, the computing device 106 predicts a second potential outcome of performing the first operation on the target object 107 by estimating an outcome of performing the first operation on an observed object (e.g., the second set of observed objects 120) subjected to the second operation. The computing device 106 may obtain the second prediction model described with respect to block 230 and FIG. 3, and predict the second potential outcome based on the second prediction model. For example, the computing device 106 may use equation (14) to calculate the second potential outcome $E(Y_{t_1}|X=x, T=t_2)$. In an embodiment where there is the third operation ($t_3$), the computing device 106 may further obtain the above-described third prediction model, and predict a third potential outcome based on the third prediction model. For example, the computing device 106 may use equation (14) to calculate the third potential outcome $E(Y_{t_1}|X=x, T=t_3)$.

At block 450, the computing device 106 predicts a first final outcome of performing the first operation on the target object 107 at least based on the first potential outcome, the second potential outcome, the first probability, and the second probability. For example, the computing device 106 may use calculations at blocks 420, 430, and 440 to determine the first final outcome. For example, in a situation in which there are two treatment levels, the first final outcome may be represented by the following equation (21):

$$E(Y_{t_1}|X=x)=E(Y|X=x,T=t_1)\cdot P(T=t_1|X)+P(T=t_2|X=x)\cdot E(Y_{t_1}|X=x,T=t_2) \quad (21)$$

In an embodiment where there is the third operation, the computing device 106 may predict the first final outcome based on the first potential outcome, the second potential outcome, the third potential outcome, the first probability, the second probability and the third probability. For example, in a situation in which there are three treatment levels, the first final outcome may be represented by the following equation (21'):

$$E(Y_{t_1}|X = x) = E(Y|X = x, T = t_1)\cdot P(T = t_1|X) + P(T = t_2|X = x)\cdot$$
$$E(Y_{t_1}|X = x, T = t_2) + P(T = t_3|X = x)\cdot E(Y_{t_1}|X = x, T = t_3) \quad (21')$$

In some embodiments, the computing device 106 may further predict a fourth potential outcome of performing the second operation on the target object 107, e.g., based on the above-described fourth prediction model. The computing device 106 may predict a fifth potential outcome of performing the second operation on the target object 107 by estimating an outcome of performing the second operation on an observed object subjected to the first operation, e.g., based on the above-described fifth prediction model. The computing device 106 may further predict a second final outcome of performing the second operation on the target object 107 based on the fourth potential outcome, the fifth potential outcome, and respective probabilities. For example, in a situation in which there are two treatment levels, the second final outcome may be represented by the following equation (22):

$$E(Y_{t_2}|X=x)=E(Y|X=x,T=t_2)\cdot P(T=t_2|X)+P(T=t_1|X=x)\cdot E(Y_{t_2}|X=x,T=t_1) \quad (22)$$

In a situation in which there are three treatment levels, the second final outcome may be represented by the following equation (22'):

$$E(Y_{t_2}|X = x) = E(Y|X = x, T = t_2)\cdot P(T = t_2|X) + P(T = t_1|X = x)\cdot$$
$$E(Y_{t_2}|X = x, T = t_1) + P(T = t_3|X = x)\cdot E(Y_{t_2}|X = x, T = t_3) \quad (22')$$

In some embodiments, the computing device 106 may predict a difference between the first final outcome of performing the first operation on the target object 107 and the second final outcome of performing the second operation on the target object 107, i.e., ITE of the first operation relative to the second operation. For example, the computing device 106 may calculate ITE of the first operation $t_1$ relative to the second operation $t_2$ for the target object 107 based on the ITE representation 105:

$$ITE(t_1,t_2;x)=E(Y_{t_1}|X=x)-E(Y_{t_2}|X=x) \quad (23)$$

In some embodiments, the computing device 106 may provide (e.g., to the user) at least one of the predicted first final outcome, the second final outcome, and ITE as the prediction outcome 108 as shown in FIG. 1, so as to help the user to make a decision whether to perform the first operation or the second operation on the target object 107.

In some embodiments, the computing device 106 may determine a target operation to be performed on the target object 107 from the first operation and the second operation based on the determined difference (e.g., ITE). The computing device 106 may select the target operation based on the determined difference in a simple manner. For example, if the determined difference indicates that ITE is positive effect or active effect, then the computing device 106 may determine that the first operation is to be performed on the target object 107. The computing device 106 may further select the target operation in conjunction with another factor, e.g., in conjunction with the cost (e.g., time cost, expense cost) difference between the first operation and the second operation. For example, if the ratio of ITE to the cost difference is greater than a threshold ratio, then the computing device 106 may determine that the first operation is to be performed on the target object 107.

Although the processes 200 and 400 as described are implemented by two computing devices, it should be understood that the processes described herein may be implemented by the same computing device or by a distributed computing system. The scope of the present disclosure is not limited in this regard.

A specific example will be described below. The dataset used here comes from a semi-simulated study based on the Infant Health and Development Program (IHDP). The IHDP data has treatment and features from a real randomized experiment, studying the effect of high-quality child care and home visits on future cognitive test scores. The experiment uses a simulated outcome so that the true treatment effect is known. Starting with the experimental data, an observational study is created by removing a subset of the treated population. The dataset includes 747 individuals, with 139 treated and 608 controls, each individual is represented by 25 covariates measuring properties of the child and his/her mother.

The treatment denotes whether a premature infant receives high-quality child care and home visits from a trained provider, the continuous outcome denotes the future cognitive test scores of the infant, the 25 features include measurements on the child-birth weight, head circumference, weeks born preterm, gender, twin status, and measurements on the mother at the time when she gave birth-age, marital status, educational attainment. In total, there are 6 continuous covariates and 19 binary covariates.

In the step described above with respect to block 210, the predicted future cognitive test scores of a premature infant is obtained for the given infant's 25 features.

In the step described with respect to block 220, the prediction about the underlying probability of a premature infant receiving high-quality child care and home visits is obtained based on the infant's 25 features.

In the step described with respect to block 230, for infants who receive high-quality child care and home visits, the predicted future cognitive test scores under the assumption that they do not receive such child care is obtained, and for infants who do not receive high-quality child care and home visits, the predicted future cognitive test scores under the assumption that they had received such child care is obtained.

Finally, estimate of the treatment effect of high-quality child care and home visits from a trained provider on future cognitive test scores for each premature infant may be obtained based on the above steps.

The above-mentioned IHDP data is learned by using traditional methods, the representation learning method, and the method of the present disclosure to predict ITE. The outcomes show that the method of the present disclosure outperforms the traditional methods and the representation learning method in terms of both the Precise in Estimation of heterogeneous effect (PEHE) and the root mean square error.

The implementation of the solution according to the present disclosure will be described in conjunction with specific embodiments.

In the medical field, for the same disease, the doctor or the patient might need to choose from a variety of treatment means or methods, e.g., choose whether to administer a certain drug, choose a drug from a variety of drugs, or choose a physical therapy from a variety of physical therapies (such as infrared therapy, magnetic therapy), etc. For the sake of description, treatment means A, B, C and the like will be used for representation. Usually doctors choose treatment means based on personal experience, but this relies heavily on subjective judgment and experience accumulation. Medical institutions usually have the treatment status (referred to as observed data below) of patients with the same disease who receive A, B, and C treatments, respectively.

Observed data may include various features of previous individual patients, such as age, weight, blood pressure, and various examination data related to the disease, and include the treatment effects of these individual patients after receiving treatment, e.g., whether the disease disappears, physiological parameters after receiving treatment, etc. It is desirable to use such observed data to predict the treatment effect of these treatment means on a target patient who is currently to receive treatment, and the effect difference (e.g., ITE) between different treatment means, so as to determine the treatment means for the target patient. However, such observed data usually has the above-mentioned covariate shift problem. For example, due to the cost difference among different treatment means, observed data might have a shift in the economic status of individual patients. If such covariate shift problems are not considered, the obtained prediction is not objective or accurate enough.

With the solution provided in the present disclosure, the covariate shift problem may be solved, and the treatment effect of treatment means A, B and C on the target patient and the effect difference between any two treatment means may be accurately predicted. The predicted treatment effect and/or effect difference may be provided to doctors or patients so as to assist them in choosing treatment means. Additionally or alternatively, the computing device may also automatically determine treatment means based on a predetermined rule, just as described above. In this manner, more suitable and effective treatment means may be chosen for patients.

In the education field, students might need to choose a course from multiple similar courses with different specific arrangements (e.g., English courses with different proportions of listening, speaking, reading, and writing), or educational institutions need to recommend more suitable courses to students. Usually educational institutions have observed data in this aspect. Observed data may include features of students previously attending courses D, E, F and the like, such as age, gender, whether they have attended similar courses, family financial situation and other information, as well as individual students' performance after attending the respective courses, such as test scores, awards, etc.

It is desirable to use such observed data to help students, who are currently selecting courses, to make decisions or recommend more suitable courses to them. Similar to the aforementioned, observed data usually has covariate shift. As a result, traditional prediction methods fail to accurately and objectively recommend courses to students.

With the above-mentioned solution provided in the present disclosure, the covariate shift problem may be solved, and the learning effect of courses D, E and F on the target student and the effect difference between any two courses may be accurately predicted. The predicted learning effect and/or effect difference may be provided to students so as to assist them in course selection. Additionally or alternatively, the computing device may also automatically recommend more suitable courses to students based on a predetermined rule, just as described above. For example, if ITE indicates positive or active effect for courses D and E, then course D may be recommended to the target student. In this manner, more suitable and helpful courses may be chosen for students.

Figure 5:
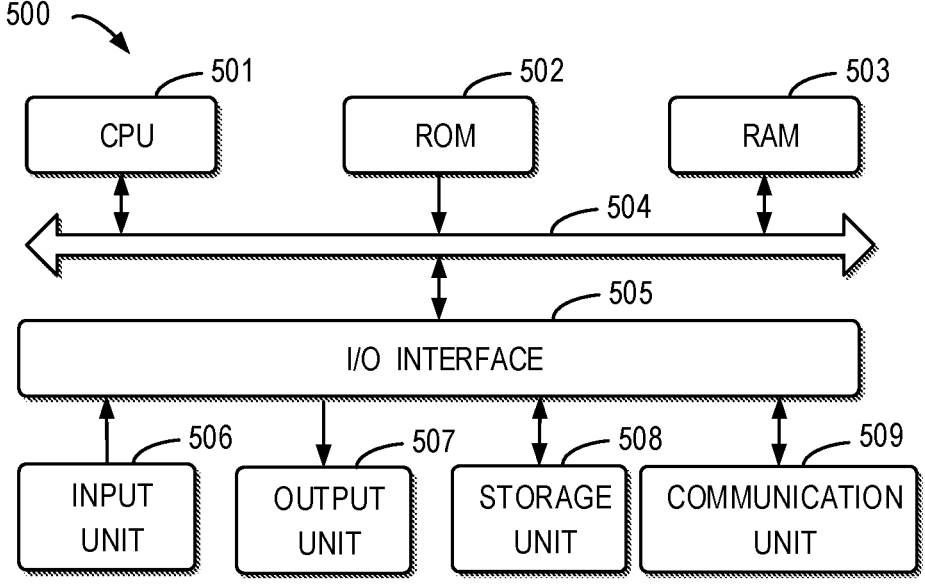
FIG. 5 shows a block diagram of an example device which can be used to implement embodiments of the present disclosure.

FIG. 5 is a schematic block diagram illustrating an example device 500 that can be used to implement embodiments of the present disclosure. As illustrated, the device 500 includes a central processing unit (CPU) 501 which can perform various appropriate acts and processing based on the computer program instructions stored in a read-only memory (ROM) 502 or computer program instructions loaded into a random access memory (RAM) 503 from a storage unit 508. The RAM 503 also stores various types of programs and data required for operations of the device 500. The CPU 501, ROM 502, and RAM 503 are connected to each other via a bus 504. An input/output (I/O) interface 505 is also connected to the bus 504.

Various components in the device 500 connected to the I/O interface 505 include: an input unit 506, such as a keyboard, a mouse and the like; an output unit 507, such as a variety of types of displays, loudspeakers and the like; a storage unit 508, such as a magnetic disk, an optical disk and the like; and a communication unit 509, such as a network card, a modem, a wireless communication transceiver and the like. A communication unit 509 enables the device 500 to exchange information/data with another device via a computer network such as Internet and/or a variety of telecommunication networks.

The processing unit 501 performs various methods and processes as described above, for example, any of the processes 200, 300 and 400. For example, in some embodiments, any of the processes 200, 300 and 400 may be implemented as a computer software program or computer program product, which is tangibly included in a machine-readable medium, such as the storage unit 508. In some implementations, the computer program can be partially or fully loaded and/or installed to the device 500 via ROM 502 and/or the communication unit 509. When the computer program is loaded to RAM 503 and executed by CPU 501, one or more steps of the processes 200, 300 and 400 described above can be implemented. Alternatively, in other implementations, CPU 501 may be configured to implement the any of the processes 200, 300 and 400 in any other suitable manners (for example, by means of a firmware).

According to some embodiments of the present disclosure, a computer-readable medium storing a computer program that when executed by a processor, implements a method according to the present disclosure, is provided.

Those skilled in the art should understand that various steps of the method of the present disclosure may be performed by a general-purpose computing device, and they may be concentrated on a single computing device or distributed over a network composed of multiple computing devices. Alternatively, they may be implemented by computing device-executable program code, such that they may be stored in the storage device and executed by the computing device, or they may be separately manufactured into individual integrated circuit modules, or multiple modules or steps may be manufactured into a single integrated circuit module. Thus, the present disclosure is not limited to any specific combination of hardware and software.

It should be understood although several components or sub-components of the device are mentioned in the above described description, such division is merely exemplary and not mandatory. In fact, according to embodiments of the present disclosure, the above-described features and functions of two or more components may be embodied in a single component. On the contrary, the above described features and functions of a single component may further be divided into multiple components.

The descriptions as described above are merely optional embodiments of the present disclosure and are not intended to limit the present disclosure. Various alterations and changes may be made to the present disclosure for those skilled in the art. Any modifications, equivalent replacements and improvements within the spirit and principles of the present disclosure should be included in the protection scope of the present disclosure.

We claim:

1. A method of predicting an operation outcome, comprising:

determining a first prediction model based on a first set of observed data, the first set of observed data comprising a first set of observed outcomes of performing a first operation on a first set of observed objects, inputting the first set of observed data into the first prediction model, the first prediction model used to predict a first potential outcome of performing the first operation on a target object;

determining a first probability model based on the first set of observed objects subjected to the first operation and a second set of observed objects subjected to a second operation different from the first operation, inputting the first set of observed objects and the second set of observed objects into the first probability model, the first probability model used to determine respective probabilities of performing the first operation and the second operation on the target object;

determining a second prediction model based on the first set of observed data and the first probability model, the second prediction model predicting a second potential outcome of performing the first operation on the target object by estimating an outcome of performing the first operation on the second set of observed objects;

determining a first combination of at least the first prediction model, the second prediction model and the first probability model for predicting a first final outcome of performing the first operation on the target object;

determining a second probability model based on the first set of observed objects, the second set of observed objects and a third set of observed objects subjected to a third operation, the third operation being different from the first operation and the second operation, inputting the first set of observed objects, the second set of observed objects and the third set of observed objects into the second probability model, the second probability model used to determine a probability of performing the third operation on the target object; and determining a third prediction model based on the first set of observed data, the first probability model and the second probability model, the third prediction model predicting a third potential outcome of performing the first operation on the target object by estimating an outcome of performing the first operation on the third set of observed objects, and wherein determining the first combination comprises combining outputs of the first prediction model, the second prediction model, the third prediction model, the first probability model and the second probability model.

2. The method of claim 1, wherein determining the first prediction model comprises:

establishing a first objective function for determining the first prediction model based on the first set of observed objects and the first set of observed outcomes; and determining a model parameter of the first prediction model by minimizing the first objective function.

3. The method of claim 1, wherein determining the second prediction model comprises:

determining a sample weight based on the first probability model, the number of the first set of observed objects and the number of the second set of observed objects, the sample weight used to correct a shift of a distribution of the second set of observed objects relative to a distribution of the first set of observed objects; and determining the second prediction model based on the sample weight and the first set of observed data.

4. The method of claim 3, wherein determining the second prediction model based on the sample weight and the first set of observed data comprises: establishing a second objective function for determining the second prediction model based on the sample weight, the first set of observed objects and the first set of observed outcomes; and determining a model parameter of the second prediction model by minimizing the second objective function.

5. The method of claim 1, further comprising:

determining a fourth prediction model based on a second set of observed data, the second set of observed data comprising a second set of observed outcomes of performing the second operation on a second set of observed objects, the fourth prediction model used to predict a fourth potential outcome of performing the second operation on the target object;

determining a fifth prediction model based on the second set of observed data and the first probability model, the fifth prediction model predicting a fifth potential outcome of performing the second operation on the target object by estimating an outcome of performing the second operation on the first set of observed objects; and determining a second combination of at least the fourth prediction model, the fifth prediction model and the first probability model for predicting a second final outcome of performing the second operation on the target object.

6. The method of claim 5, further comprising:

determining a difference representation based on the first combination and the second combination, the difference representation used to predict a difference between the first final outcome of performing the first operation on the target object and the second final outcome of performing the second operation on the target object.

7. A method of predicting an operation outcome, comprising:

predicting a first potential outcome of performing a first operation in a set of operations on a target object in response to determining that an operation in the set of operations is to be performed on the target object, wherein predicting the first potential outcome comprises: obtaining a first prediction model, the first prediction model determined based on a first set of observed data, the first set of observed data comprising a first set of observed outcomes of performing the first operation on a first set of observed objects; inputting the first set of observed data into the first prediction model; and predicting the first potential outcome based on the first prediction model;

determining a first probability of performing the first operation on the target object and a second probability of performing a second operation in the set of operations on the target object, the second operation being different from the first operation, wherein determining the first probability and the second probability comprises:

obtaining a probability model, the probability model determined based on the first set of observed objects subjected to the first operation and a second set of observed objects subjected to the second operation;

inputting the first set of observed objects and the second set of observed objects into the probability model; and determining the first probability and the second probability based on the probability model;

predicting a second potential outcome of performing the first operation on the target object by estimating an outcome of performing the first operation on an observed object subjected to the second operation; and predicting a first final outcome of performing the first operation on the target object at least based on the first potential outcome, the second potential outcome, the first probability and the second probability, wherein the set of operations further comprises a third operation different from the first operation and the second operation, and wherein the method further comprises:

determining a third probability of performing the third operation on the target object; and predicting a third potential outcome of performing the first operation on the target object by estimating an outcome of performing the first operation on an observed object subjected to the third operation, and wherein predicting the first final outcome comprises predicting the first final outcome based on the first potential outcome, the second potential outcome, the third potential outcome, the first probability, the second probability and the third probability.

8. The method of claim 7, wherein predicting the second potential outcome comprises:

obtaining a second prediction model, the second prediction model determined based on the first set of observed data and the probability model; and predicting the second potential outcome based on the second prediction model.

9. The method of claim 7, further comprising:

predicting a fourth potential outcome of performing the second operation on the target object; predicting a fifth potential outcome of performing the second operation on the target object by estimating an outcome of performing the second operation on the observed object subjected to the first operation; and predicting a second final outcome of performing the second operation on the target object at least based on the fourth potential outcome, the fifth potential outcome, the first probability and the second probability.

10. The method of claim 7, further comprising:

predicting a difference between the first final outcome of performing the first operation on the target object and a second final outcome of performing the second operation on the target object.

11. The method of claim 10, further comprising:

determining, based on the difference, a target operation to be performed on the target object from the first operation and the second operation.

12. An electronic device, comprising:

a processor; and a memory coupled to the processor, wherein the memory comprises instructions stored thereon which when executed by the processor, cause the device to perform acts comprising:

predicting a first potential outcome of performing a first operation in a set of operations on a target object in response to determining that an operation in the set of operations is to be performed on the target object, wherein predicting the first potential outcome comprises:

obtaining a first prediction model, the first prediction model determined based on a first set of observed data, the first set of observed data comprising a first set of observed outcomes of performing the first operation on a first set of observed objects;

inputting the first set of observed data into the first prediction model; and predicting the first potential outcome based on the first prediction model;

determining a first probability of performing the first operation on the target object and a second probability of performing a second operation in the set of operations on the target object, the second operation being different from the first operation, wherein determining the first probability and the second probability comprises:

obtaining a probability model, the probability model determined based on the first set of observed objects subjected to the first operation and a second set of observed objects subjected to the second operation;

inputting the first set of observed objects and the second set of observed objects into the probability model; and determining the first probability and the second probability based on the probability model;

predicting a second potential outcome of performing the first operation on the target object by estimating an outcome of performing the first operation on an observed object subjected to the second operation; and predicting a first final outcome of performing the first operation on the target object at least based on the first potential outcome, the second potential outcome, the first probability and the second probability, wherein the set of operations further comprises a third operation different from the first operation and the second operation, and the acts further comprise:

determining a third probability of performing the third operation on the target object; and predicting a third potential outcome of performing the first operation on the target object by estimating an outcome of performing the first operation on an observed object subjected to the third operation, and wherein predicting the first final outcome comprises predicting the first final outcome based on the first potential outcome, the second potential outcome, the third potential outcome, the first probability, the second probability and the third probability.

13. The electronic device of claim 12, wherein predicting the second potential outcome comprises:

obtaining a second prediction model, the second prediction model determined based on the first set of observed data and the probability model; and predicting the second potential outcome based on the second prediction model.

* * * * *